June 26, 1923.  
A. CAPPELLARI  
LOCK FOR VEHICLES  
Filed June 23, 1922
1,460,015
2 Sheets-Sheet 1
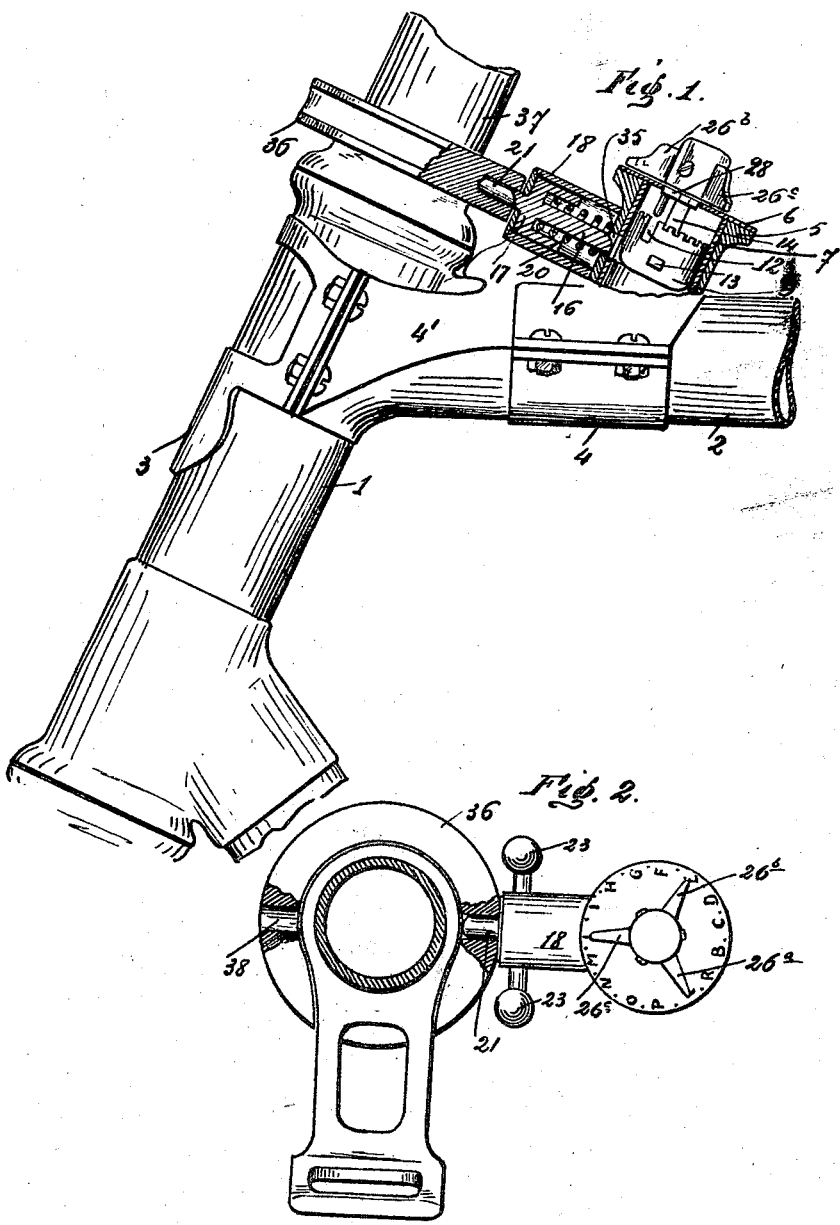
Inventor  
A. Cappellari,  
By Marks&Clerk  
Attys.

June 26, 1923.
A. CAPPELLARI
LOCK FOR VEHICLES
Filed June 23, 1922
1,460,015
2 Sheets-Sheet 2
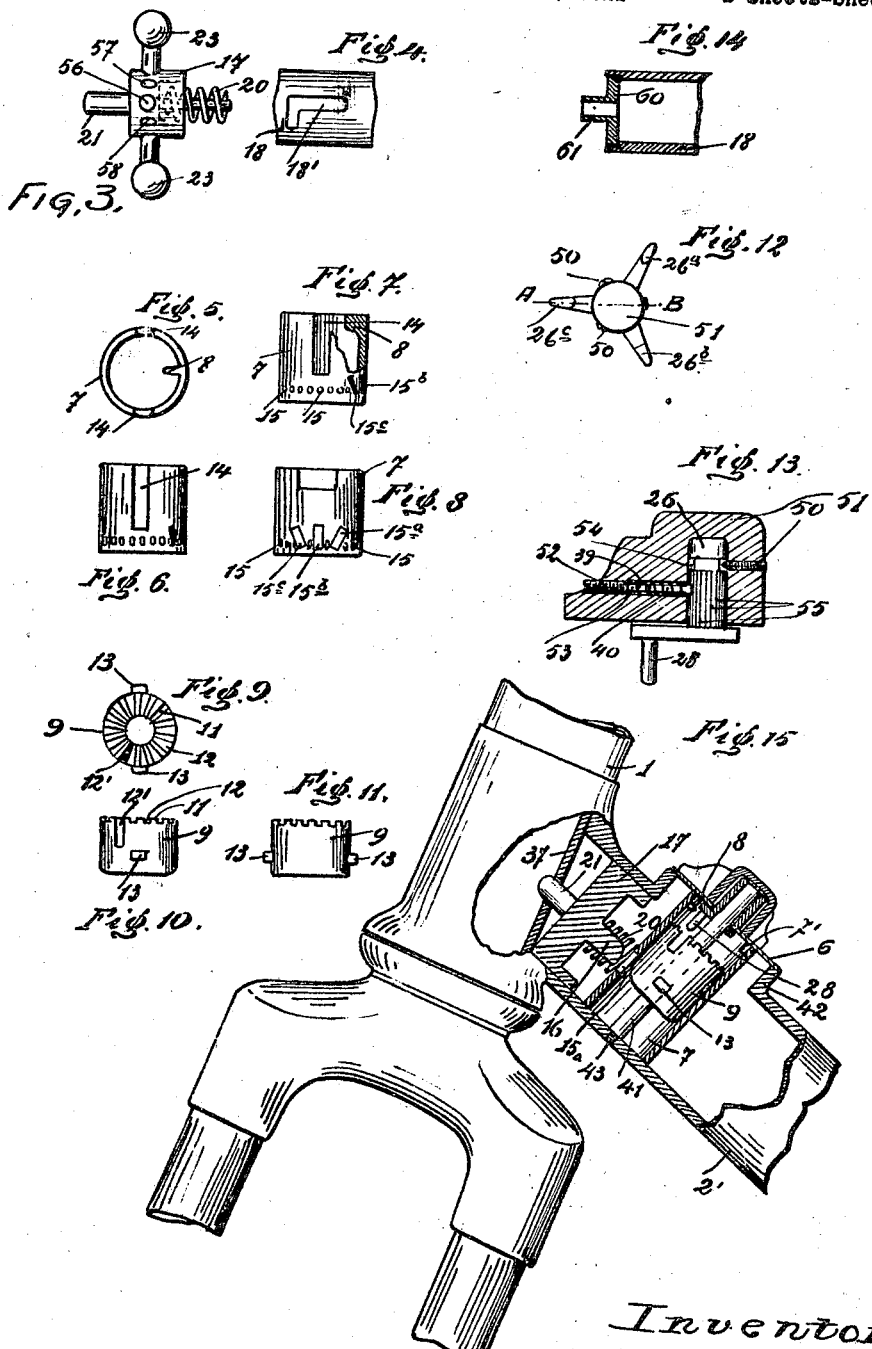
Inventor
A. Cappellari
By Marks & Clerk
Attys.

Patented June 26, 1923.

UNITED STATES PATENT OFFICE.

1,460,015

ALFONSO CAPPELLARI, OF BOLOGNA, ITALY, ASSIGNOR OF ONE-HALF TO LUIGI DONZELLI, OF BOLOGNA, ITALY.

LOCK FOR VEHICLES.

Application filed June 23, 1922. Serial No. 570,333.

*To all whom it may concern:*

Be it known that I, ALFONSO CAPPELLARI, residing at 2 Via Lodovico Berti, Bologna, Italy, subject of the King of Italy, have invented certain new and useful Improvements in Locks for Vehicles, of which the following is a specification.

The present invention relates to a device which can be advantageously employed for preventing thefts of vehicles and also for other locking purposes.

Generally, the device comprises a bolt which, under the action of a spring, is caused to penetrate into a bore so as to establish the rigid connection of the two parts to be connected, and, in the special case of a vehicle, the rigid connection of the steering tube to the support thereof. Consequently the steering tube will remain fixed so that the vehicle can not be employed.

The invention is shown in the annexed drawings as applied to a bicycle. In said drawings—

Fig. 1 is a side view of a portion of a frame of a bicycle to which the invention is applied, the device being represented in a partly longitudinal vertical section.

Fig. 2 is a top plan view partly in section.

Figs. 3 to 14 represent in different scale various details of said device.

Fig. 15 is a view similar to that shown in Fig. 1 and illustrating a modification.

Referring to Figs. 1 to 13, on tubes 1 and 2 of the frame of a bicycle are mounted connecting plates 3, 4 and 4' which are assembled therewith by means of rivets, bolts and nuts or in any other suitable manner. From the connecting plate 4 a cylindric tube 5 projects upwardly and is provided with a cover 6, bored at the centre to receive the pivot 26. On the external surface of said cover dial marks are impressed as shown in Fig. 2. In said tube 5, another tube 7 is fitted, and this latter tube can be rotated about its own axis but cannot move axially. In the tube 7 is arranged a cylindrical block 9 whose lower edge is rounded or bevelled. The block 9 is provided with two diametrally opposite projections 13 which are arranged in two diametrally opposite longitudinal guides 14 in the wall of the tube 7, so that the block 9 can be moved along said guides and also about the axis of said tube 7 together with the latter.

The pivot 26 is solid and is provided, as best shown in Fig. 13, with an angle piece 28. As shown in Fig. 7, the upper part of the inner surface of tube 7 is provided with a projection 8 against which the vertical arm of said angle plate 28 can be pushed when, by turning the pivot 26, it is desired to cause the tube 7 to turn about its own axis. The upper surface of the block 9 is provided with little radial projections 11 forming radial grooves 12 (Figs. 9 and 10). One of said grooves, 12', is very deep so as to permit, when the vertical arm of said angle piece 28 lies on the same plane as said groove 12', of the block 9 being raised by the action of the stem 16, which will be clearly explained hereinafter.

From the tube 5, and perpendicularly to same, a tubular box 18 extends, in which is arranged a cylindrical block 17 provided at one of its ends with a cylindrical pin 21 and at the other end with a stem 16, rectangular in cross-section. The point of said stem faces a hole 35 bored through the wall of the tube 5 and corresponds to the shape of other holes $15^a$, $15^b$ and $15^c$ bored through the wall of the tube 7. The hole 35 is larger than the holes $15^a$, $15^b$ and $15^c$, but the size of the hole 35 is less than the height of the main portion of the stem 16. The holes $15^a$ and $15^c$ are inclined whilst the intermediate hole $15^b$ is vertical. At the same level of said holes $15^a$, $15^b$ and $15^c$, through the wall of tube 7, a series of small holes 15 is provided. The lower edge of the holes 35 and 15 lies substantially at the same level when the block 9 is in its lower position. The free end of the stem 16 is bevelled as represented in Fig. 1. On the steering tube 37 a ring 36 is fixed. Said ring 36 is provided with two diagonally opposite holes 38, the axes of which lie in a plane perpendicular to longitudinal axes of the steering tube of the vehicle. In the drawing the device is shown in locking position with the steering tube 37 turning at an angle of 90°.

The pivot 26 is provided with longitudinal external ribs 55. On said pivot 26 (see Fig. 13) is loosely connected, by means of screws 50 engaging a peripherical groove 54 provided in said pivot, a block 51 from which three pointers $26^a$, $26^b$ and $26^c$ project. In only one, or in all of said pointers is bored a longitudinal hole 53 (Fig. 13) into which a pin 40 provided with sharp point is pushed, by means of a spring 39 held in place by a set screw 52. The point of this pin engages the grooves formed between said ribs 55. This arrangement permits the combination to be readily changed, and allows the members 7, 28 and groove 12' to be replaced in the positions adapted to permit the unlocking operation. To put the device in unlocking position, it is necessary to impart to the pointer chosen two distinct movements. The first in one direction to bring the holes 15ᵃ (or 15ᵇ or 15ᶜ) to face the hole 35, and the second in a direction contrary to the first direction to bring the vertical arm of the angle piece 28 above the deepest groove 12' of the block 9.

In Fig. 1 the device is shown in a position permitting unlocking. For effecting unlocking, the arms 23 mounted on the block 17 and passing through the bayonet slots 18' of tube 18 are moved by the operator from left to right. The tapering point of the stem 16 will pass through the holes 35 and 15ᵇ, will enter the tubes 7 and will raise the block 9. This is permitted as the vertical arm of the angle piece 28 can move into the deep groove 12' of the block 9. When the pin 21 has been withdrawn from the hole 38 of the ring 36, the steering tube 37 may be rotated 90° about its axis to bring the steering wheel into operative position. When the arms 23 are released by the operator the pin 21, under the influence of the spring 20, will slide on the continuous half peripherical face of the ring 36 without entering any one of the holes 38. Into these holes the pin 21 can enter when the steering tubes 37 is turned 90° about its axis in either direction. Only in this case is the locking action exerted. Upon locking the steering tube, the cyclist will displace the pointers on the quadrant and unauthorized persons can not unlock the device.

The arms 23 are in threaded connection with the block 17 so as to permit their dismounting and replacing them in one of the other pairs of diametrally opposite holes 56, 57 and 58 (Fig. 3). Assuming that the position represented in Fig. 3 is adapted for unlocking by introducing the stem 16 into the tube 7 through the hole 15ᵇ, then when the device is to be arranged in a manner adapted for unlocking by introducing the stem 16 into the tube 7 through one of the holes 15ᵃ and 15ᶜ, the arms 25 will have to be fitted respectively in the pair of holes 57 or 58. Should it be desired to prevent unlocking the arms 23 will be threaded in the pair of holes 56 and the stem 16 will be turned 90° from the position it occupies in Fig. 1. In this case the stem 16 can not enter the tube 7 because it cannot pass through the holes 35 and 15ᵃ, 15ᵇ or 15ᶜ, these holes being narrower than the height of the stem 16. The above operations are allowed by the lateral extensions of the slots 18' of the tube 18 when the device is in locking position. The lateral extensions permit the turning of the block 17 about its axis by the arms 23.

Referring to the modification shown by Fig. 15, the device is arranged in one of the tubes of the frame of a bicycle in proximity of the tube in which the steering tube 37 is displaced. The device differs from that above referred only in that: The pivot 26 and the block 9 are axially bored to permit of a cylindrical stem 41 being passed therethrough. Said stem is screwed at 43 into the tube 2'. The tube 5 is abolished. The pin 21 is designed to enter a hole in the steering tube 37. In all other respects and in operation the device is similar to that above described. It is obvious that the arrangement of Figs. 1 to 13 may be applied to the tube 2' and that the pin 21, after passing through a bore in the supporting steering tube 1 can engage another bore provided in the steering tube 37. To facilitate the locking operation and to eliminate all friction counteracting the displacement of the locking member, on the head of the tubular chamber 18 facing the supporting steering tube 1, a disc 60 bored at the centre is applied. From the external face of said disc an annular member 61 projects and lies in alignment with the bore of the supporting steering tube 1.

The devices above described are particularly useful for locking a steering tube of a bicycle. It is, however, obvious that the device can be applied, with proper modifications suggested by those skilled in the art, as a safety device for locking doors, boxes and the like.

Having now particularly described the nature of my invention and in what matter the same is to be performed, I declare that what I claim is:

1. A safety device including a cylindrical box mounted on one of the parts to be locked, a sliding block in said box provided with a bolt, a spring for forcing said bolt toward the other part to be locked, a bore in the last mentioned part adapted to receive said bolt, a stem projecting from said block and extending in a direction opposite to that of said bolt, manually operated means for moving said block in one direction against the action of said spring, a cylindrical tube arranged at right angles to said box and provided with an aperture to permit the passage of said stem, a tubular chamber arranged at right angles to said box and provided with an aperture to permit the passage of said stem, a rotatable tube arranged in said chamber, a block arranged in said tube and axially guided by the latter, a cover for said chamber, a pivot pin mounted in said cover and provided with an integral angle piece, the upper face of said cover forming a dial, a block provided with radial pointers loosely connected to the pivot piece, radial grooves in the upper face of the block arranged in the tube, one of said grooves being of greater depth than the remainder of the grooves to permit the arm of the angle piece to enter the same and allow the block within the tube to move toward said cover, and a projection on said tube adapted to be engaged by the arm of the angle piece to cause rotation of the tube, a series of peripherally arranged small apertures in the wall of said rotatable tube lying in the plane in which the stem moves, said tube being also provided with larger holes adapted to receive said stem when one of the last mentioned holes registers with the aperture in the cylindrical chamber.

2. A safety device as claimed in claim 1 in which the first mentioned bore is associated with the steering post of a vehicle, and in which said cylindrical block and tubular chamber are mounted on the frame of said vehicle.

3. In a lock, a bolt casing, a block movably mounted in said casing and provided at one end with a projecting bolt and provided at its opposite end with a stem, resilient means for moving the block in one direction, manually operable means for moving the block in the opposite direction, a housing arranged at one end of said casing and having an aperture through which said stem may project, a tube movably mounted in said housing and provided with an aperture adapted to register with the aperture in the housing, an axially movable block arranged in said tube, a cover for said housing provided with a dial, a pointer block arranged exteriorly of said cover and having pointers adapted to cooperate with said dial, a spindle associated with said pointer block and having a projecting finger, a lug arranged on said tube adapted to be moved by said finger, and a series of grooves provided in one end of said tube block, one of said grooves being sufficiently deep to enclose said finger when the tube block is moved towards the pointer block.

4. A lock as claimed in claim 3 in which the block arranged in said casing is provided with a plurality of pairs of apertures, and in which the manually operated means for moving said block includes pins interchangeably engaging pairs of the last mentioned apertures, the aperture of said housing being of less width than the height of said stem in order to prevent the passage of the stem through said housing aperture, when the casing block is turned a predetermined extent.

5. A lock as claimed in claim 3 in which said tube and tube block are provided with cooperating guiding members adapted to prevent the tube block from rotating relatively to said tubes.

Signed at Milan, Italy, this 24th day of May, 1922.

ALFONSO CAPPELLARI.